Dec. 6, 1966  G. H. SUDMEIER  3,290,525
ALTERNATOR STRUCTURE
Filed Oct. 11, 1963  2 Sheets-Sheet 1

INVENTOR.
GUSTAV H. SUDMEIER
BY
Nilsson, Robbins & Anderson
ATTORNEYS

Dec. 6, 1966 G. H. SUDMEIER 3,290,525
ALTERNATOR STRUCTURE
Filed Oct. 11, 1963 2 Sheets-Sheet 2

INVENTOR.
GUSTAV H. SUDMEIER
BY
Nilsson, Robbins & Anderson
ATTORNEYS

United States Patent Office 3,290,525
Patented Dec. 6, 1966

3,290,525
ALTERNATOR STRUCTURE
Gustav H. Sudmeier, 2708 Torrance Blvd.,
Torrance, Calif.
Filed Oct. 11, 1963, Ser. No. 315,569
3 Claims. (Cl. 310—153)

The present invention relates to an alternator structure for providing electrical energy and particularly to a rotative electrical machine requiring no slip rings or other terminal contact structure to communicate with a revolving member.

Electrical alternators are rotative electrical machines conventionally used in conjunction with internal combustion engines or other sources of mechanical energy, to provide alternating-current electrical energy which may be variously utilized. Prior alternators have incorporated a wide variety of structures; however, normally, a somewhat basic configuration of elements has evolved. That is, prior alternators have conventionally included a frame or stator having a cylindrical cavity in which a rotor is mounted to be evolved. The rotor normally carries electrical coils and magnetizing elements mounted inside the stator provide magnetic flux that is cut by the coils as they revolve to thereby produce electrical energy. Thus, the mechanical energy employed to revolve the rotor is converted to electrical energy.

In general, the coils of prior alternators have been interconnected to an output circuit that is connected through collector rings or slip-rings to provide the output at fixed electrical terminals. That is, as the coils are revolved in a magnetic field to generate electrical energy, a structure must be provided for communicating the energy from the revolving coils to stationary electrical terminals. In general, the communication apparatus, e.g., slip-rings or other rotative contact apparatus for communicating electrical energy, complicates the basic structure, and considerably increases the required maintenance. Therefore, a need exists for an alternator which does not require slip-rings, brushes, or other rotative connectors.

In prior alternators it has become somewhat conventional practice to provide bearings at each end of the housing or stator in which bearings the rotor rotatively is supported. These bearings require considerable maintenance and periodically they must be replaced. Therefore, a need exists for an alternator which incurs very little bearing wear, and which therefore requires little maintenance in that regard.

In addition to the above considerations, several other desirable features for an alternator include lightweight in relation to total power output, low temperature rise, economy of construction, safe use, and long life.

In general, the present invention comprises a rotative electrical machine that may be embodied in an alternator structure for generating electrical energy. In such an embodiment, the structure incorporates a set of electrical coils mounted in a circular configuration which is surrounded by an annular arrangement of magnetizing elements. The magnetizing elements may take the form of permanent magnets contained in a somewhat shallow cylindrical structure which is revolved relative the coils. In one arrangement of the present invention, the magnet structure rides on a rotative shaft of the source of mechanical energy, e.g. internal combustion engine, while the coils are affixed to the body of such machine. Therefore, as the magnets are revolved about the coils, electrical energy is induced in the coils which may be taken directly therefrom for utilization or converted to another form. In one such an arrangement of the present invention, the axis of rotation for the magnets is vertical with the result that the bearings of the driving machine serve to support the rotative element of the alternator. Furthermore, in such an arrangement, fins incorporated in the revolving magnet structure can effectively move air to accomplish increased cooling. Still further, the structure of the present invention may include a bonnet positioned about the revolving-magnet structure to accomplish a threefold purpose of shielding the machine, supporting various electrical elements as an effective heatsink, and providing a support platform for the entire structure.

An object of the present invention is to provide an improved alternator structure.

Another object of the present invention is to provide an improved alternator which may be readily constructed as a portable unit, which can be easily stored and transported from one location to another.

Still another object of the present invention is to provide an alternator structure, the alternator portion per se of which includes no bearings and which is therefore capable of sustained periods of trouble-free use.

A further object of the present invention is to provide an electrical alternator requiring no slip-rings or other rotative contact elements.

Still another object of the present invention is to provide an improved electrical alternator which is inexpensive to manufacture, safe to use, easy to maintain, and is relatively light in weight in relation to the power output.

Still another object of the present invention is to provide an alternator of novel construction wherein permanent magnets held in an annular configuration are revolved about electrical coils to accomplish the generation of electrical energy in the coils which are stationary while the electrically-free magnets are revolved upon a rotor well positioned to accomplish cooling.

These and other objects of the present invention will become apparent from a consideration of the following taken in conjunction with the drawing wherein.

Figure 1:
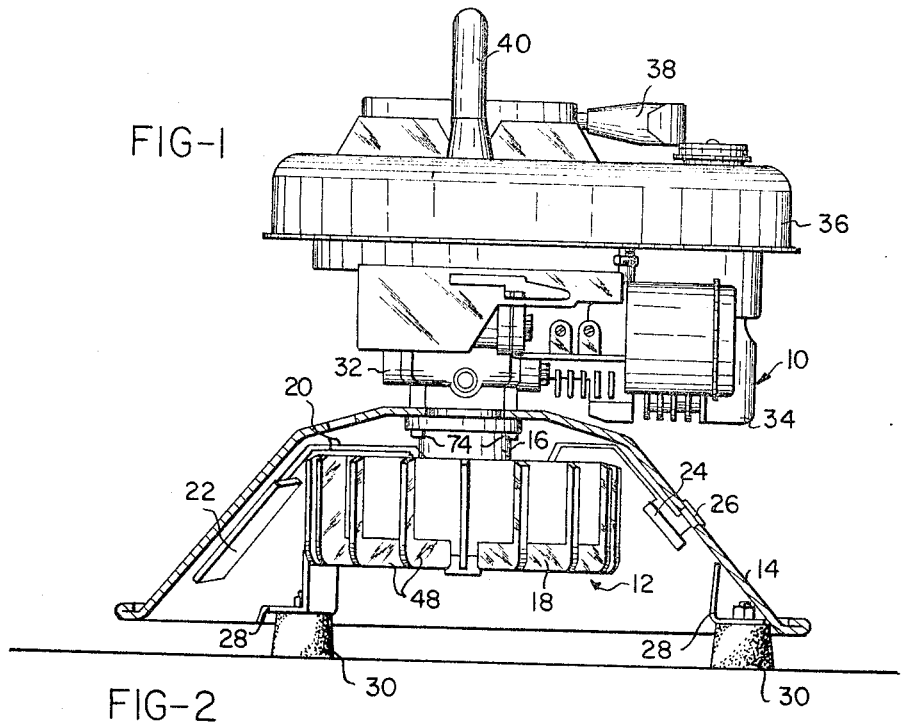
FIGURE 1 is a partially cutaway plan view of an alternator structure constructed in accordance with the present invention.

Referring initially to FIGURE 1, there is shown a vertically-supported internal combustion engine 10. The rotative energy developed by the engine 10 drives an alternator 12 positioned within a bonnet 14, which bonnet provides support for the entire structure.

The interior stationary portion, i.e. stator 16 of the alternator is fixed relative the engine 10; however, the exterior portion of the alternator, the rotor 18, revolves about the stator to provide a moving magnetic field, which thereby induces electrical energy in coils wire that are contained in the stator 16.

The electrical energy developed in the stator 16 is carried from the coils by wires 20 to electrical elements including a capacitor 22, and a diode bracket 24, which are mounted inside the somewhat truncated conical, metal bonnet 14. These electrical elements may be employed to alter the form of electrical energy taken from the alternator as described below in detail. However, in this regard, an output circuit including such elements is connected to a power-output receptacle 26, which is mounted to extend through the bonnet 14.

The bonnet 14 in addition to shielding the moving rotor 18, and providing a mount for various electrical components, serves the further function of providing support for the entire structure. To this end, leg bracket mounts 28 are affixed to the bonnet 14, as by welding, and rubber casters 30 are bolted to the mounts 28. In such a configuration, a wide stable base is provided for the entire alternator structure.

The power source, engine 10 employed as an element of the system of FIGURE 1 may take a variety of forms as well known in the prior art and the specific details of such forms are here immaterial, suffice that it have a vertical rotating shaft and a stable frame. However, specifically with reference to FIGURE 1 the engine 10 includes a frame 32 supporting a combustion chamber 34 which receives gasoline from a tank 36. The engine 10 includes a starting handle 38 and a carrying handle 40 which may be employed to carry the entire alternator structure. A magnetio (not shown) is also part of this engine to provide electrical sparking energy to the combustion chamber 34 to ignite gasoline. Thus, the engine converts the explosive energy of gasoline into mechanical energy applied to a rotative shaft to drive the alternator 12.

Figure 2:
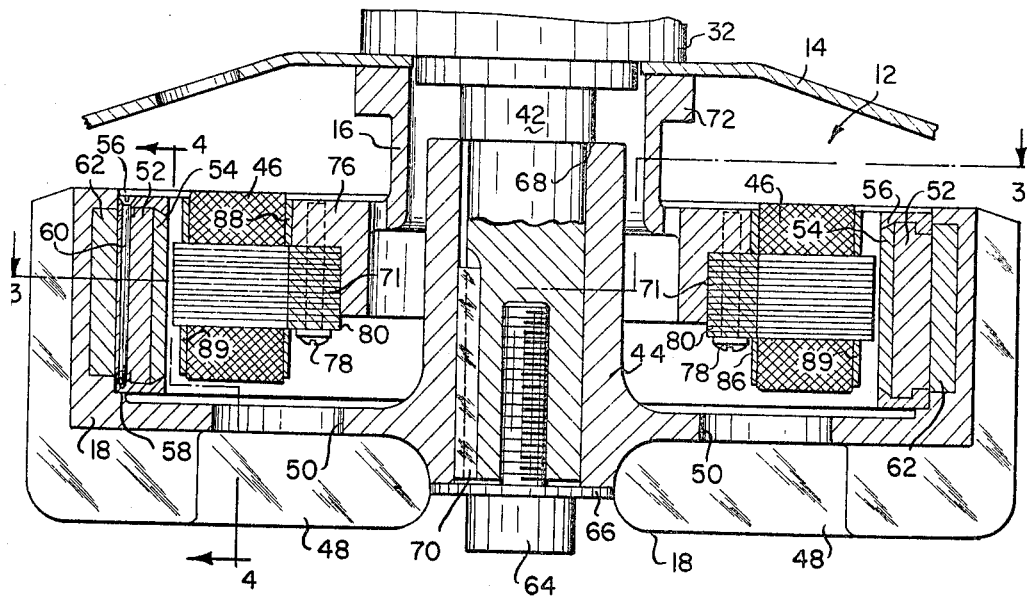
FIGURE 2 is a vertical sectional view taken through a portion of the structure of FIGURE 1.

The rotative shaft driven by the engine 10 is shown in FIGURE 2, and is designated 42. The shaft 42 is received in a pedestal sleeve 44 concentrically formed in the rotor 18 which is of generally shallow cylindrical configuration and is hollow to enclose a circular array of stationary coils 46. The rotor 18 carries external fins 48 which extend radially from the exterior center of the rotor bottom to the external periphery of the rotor, then curve to extend parallel the axis of rotation. It is to be noted, that certain spaces between the fins 48 at the lower end of the rotor are open through ports 50 to permit air circulation about the coils 46.

Figure 3:
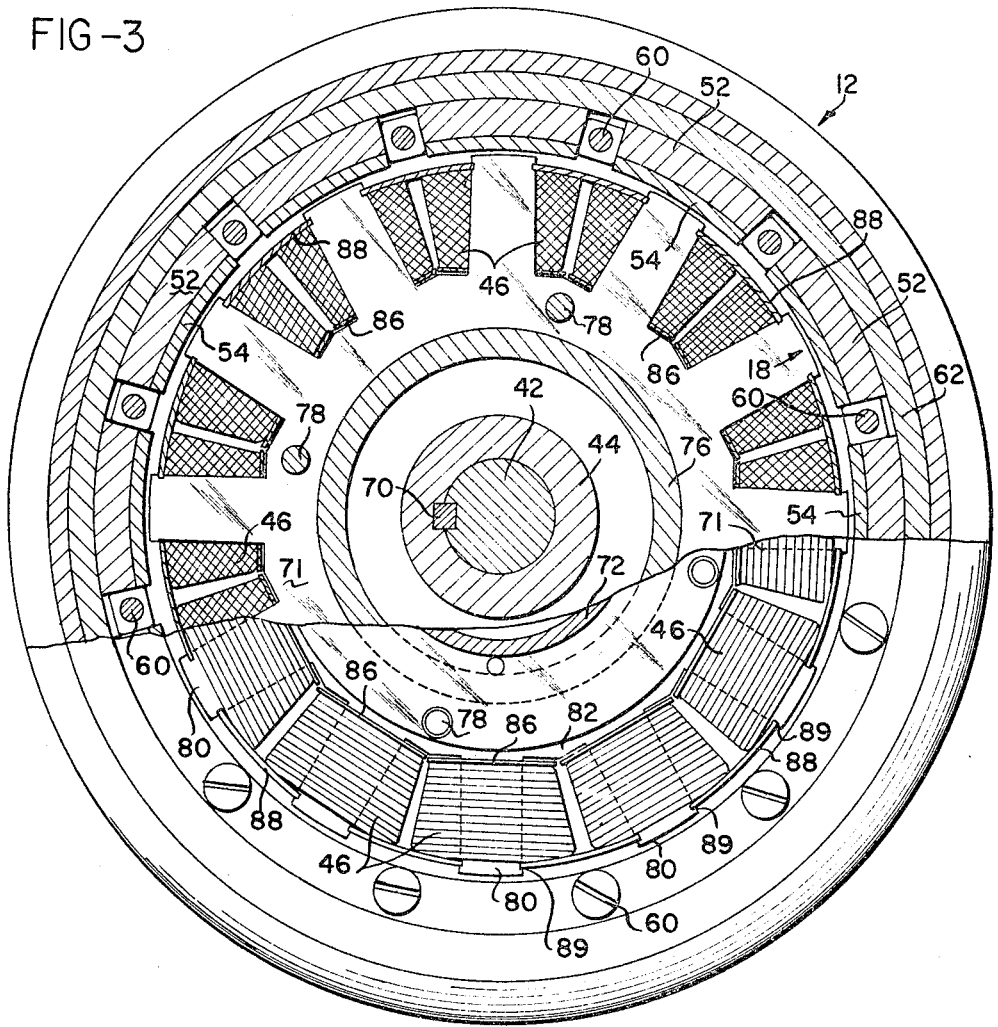
FIGURE 3 is a horizontal sectional view taken along line 3—3 of FIGURE 2.
Figure 4:
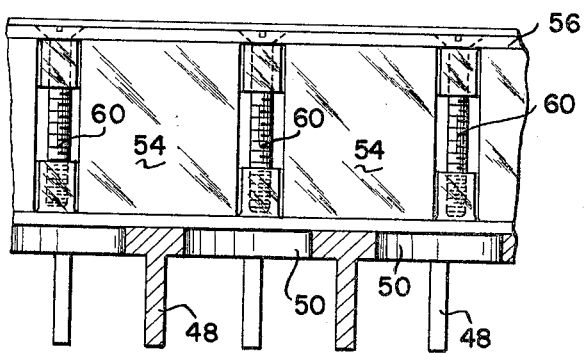
FIGURE 4 is a vertical sectional view taken along line 4—4 of FIGURE 2.

The interior curved surface of the rotor 18 contains an annular array of magnets 52 (FIGURE 3) aligned end to end and slightly spaced apart. The magnets 52 are of a somewhat square configuration having a thickness of less than one-fourth the square dimensions, which may be arcuate. The magnets may be formed of ferrite or other ceramic magnetic material permanently magnetized to form a rather intense flux pattern. The magnets 52 are arranged in the rotor to provide alternate polar faces to the coils 46 whereby a flux pattern is established between these polar faces which encompasses the coils 46 (FIGURE 3).

The magnets 52 are held in place by magnetic powdered metal pole shoes 54 which are locked in place by clamprings 56 and 58 (FIGURE 2) joined by studs 60 extending between the magnets 52. The clamp-rings 56 and 58 have flat external surfaces; however, the interior surfaces are wedge shaped to mate with the upper and lower ends of the magnets 52 and the similarly-sized shoes 54. The upper and lower edges of the shoes 54 are tapered to mate with the rings 56 and 58 so that as the studs 60 are tightened (drawing the clamp-rings 56 and 58 closer together), the shoes 54 are forced outwardly in a wedge action, thereby pressing against the magnets 52 and tightening the entire structure to rigidity against the rotor wall.

Exterior of the magnets 60, in an annular channel formed in the rotor 18, there lies a steel ring serving to complete the magnetic circuit between the individual permanent magnets 52. By using the ring 62 to complete the magnetic circuit, the body of the rotor 18 may be cast of aluminum to accomplish lightweight and lower masses of rotation. Thus, the magnetic flux on the outside of the annular array is short circuited, while the interior flux encompasses the coils.

The entire rotor structure is held on the shaft 42 (FIGURE 2) by a stud 64 extending through a washer 66 into the end of the shaft 42. The washer 66 engages the rotor 18 holding it against an annular shoulder 68 formed in the shaft 42 to mate with the end of the pedestal 44. A key 70 held mutually in a keyway on the shaft 42 and in the rotor 18, locks these two elements together for rotational movement moving the magnets 54 about the central coils.

The circular array of coils 46 is held inside the rotor 18 by a frame bracket 72 (FIGURE 2) affixed to the frame of the internal combustion engine by studs 74 (FIGURE 1). Referring to FIGURE 2, it may be seen that the bonnet 14 is held between the frame 72 of the rotor and the frame 32 of the internal combustion engine. The frame 72 encloses a portion of the shaft 42, then extends radially to provide a mounting ring 76 upon which the coils 46 are mounted. The mounting is accomplished by studs 78 which pass through a stacked group of ring laminations 70 having outward projections which from the cores 80 about which the coils 46 are wound. Thus, the coils 46 are radially mounted, i.e. they extend radially from the center of the circular configuration in which they lie held on cores provided by a stack of spider laminations 70. More specifically, referring to FIGURE 3, the laminated cores 80 may be seen to be integrally formed with an internal ring 82 on each of the laminations 70 from which the cores individually protrude radially relative the ring and the axis of rotation of the magnets.

The individual cores 80 receive two separate windings as will be explained below, which are generally interleaved above nonmagnetic spacer 86 lying at the base of each of the cores 80. Flat retaining blocks 88 extend between recesses 89 in the ends of each of the cores 80 and hold the coils in position on the individual cores. Thus the coils are held between the spacers 86 and the retaining blocks 88.

As indicated above, each of the cores 80 carries two interleaved windings, so that each coil electrically assimilates a transformer.

Figure 5:
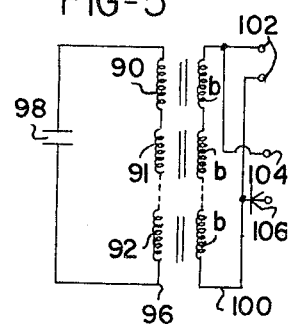
FIGURE 5 is a circuit diagram illustrating the electrical system incorporated in the alternator structure.

Referring to FIGURE 5, the individual coils are shown as individual transformers 90, 91 and 92. A first winding on each of the coils 90, 91 and 92 is designated as the $a$ winding and these are connected in series to provide a series circuit 96 which is connected across a capacitor 98. The capacitor 98 is selected to be resonant with the collective dynamic inductance of the serially connected windings $a$ of the coils 91, 92 and 90. Of course, the resonance determination is made on the basis of the frequency of alternating current developed by the alternator. This determination, is resolved on the basis of number of poles i.e., 12 poles in the described embodiment hereof; and the rate of rotation of the rotor 18.

The second windings designated $b$ of each of the coils 90, 91 and 92 are also connected in a series circuit 100, from which the output electrical energy is provided. The series circuit 100 is directly connected across terminals 102 to provide an alternating-current output and similarly connected across terminals 104 through a diode 106. Therefore, the terminals 102 provide alternating current while the terminals 104 receive halfwave rectified direct current energy as a result of the unilateral characteristic of the diode 106.

In the manufacture of the alternator structure, the engine 10 is first assembled as an operating unit. Then the alternator frame 32 receives the circular array of coils 46 which is formed as a sub-assembly. Thereafter, the rotor and the stator are affixed respectively to the shaft of the engine 10 and to its frame. In this operation, a spacing jig may be employed to provide a desired small annular gap between the ends of the coils and the faces of the magnet pole shoes. Of course, in the above assembly operation the bonnet 14 (which may be alluminum) is placed between the frames of the alternator and the engine. Upon completion of this assembly operation final wiring connections render the unit ready for operation.

In operating the system of the present invention, the internal combustion engine 10 is first started by providing gasoline to the tank 36 and activating the starter handle 38. When the engine 10 is started, the rotor 18 of the alternator 12 is revolved moving the magnets 52 through the path of their annular configuration and thereby in turn providing a moving magnetic flux pattern to each of the coils 46. The variable magnetic flux afforded the coils 46 induces electrical current in the coils, and as a result of the transformer action between the series circuit 100 and the resonance circuit 99 (as shown in FIGURE 5) the output is substantially increased. In this manner, the output of the alternator is effectively increased in a manner which does not require substantial weight increase. The voltage initially induced and reflected from the windings *a* of the coils 90, 91 and 92 in then provided from the windings *b* at the output terminals 102 and 104 for use as desired.

It is to be noted, that in the operation of the structure, the bearing in the engine 10 provides the sole support for the alternator 12. Therefore, the alternator is relatively troublefree and in view of its lightweight and manner vertical mounting, relatively small additional load is placed on the engine bearing. Therefore, the structure as shown in capable of prolonged use with very little wear on the component parts.

Furthermore, the provision of the exterior rotor 18 and internal stator 16 avoids the need for rotative contacts or terminals through which the output power is to be delivered. That is, the coils 46, as shown in FIGURE 2, are stationary relative the frame 72 and the bonnet 14, so that electrical wires 20 as shown in FIGURE 1 may pass directly from the coils to the output circuitry with no intervening slip-rings or other rotative connectors.

Other important features of the present invention will be readily apparent to those skilled in the art from a consideration of the above; however, the present invention is not to be limited to any structural arrangements shown or described herein, but rather shall be defined in accordance with the appended claims.

What is claimed is:

1. An electrical system for providing electrical energy, comprising: an internal combustion engine including a shaft revolved during operation of the engine; a hollow cylinder structure axially affixed to said shaft to be revolved thereby, said cylinder structure having one flat end thereof substantially closed, and having air-moving fins affixed thereon; a plurality of permanent magnets mounted inside said cylinder structure about the curved surface thereof; a plurality of coils positioned inside said cylinder structure and fixed relative said engine whereby said magnets provide magnetic flux to said coils, said coils including first windings and second windings, said first windings being interconnected to provide an electrical output from said system and said second windings being interconnected to provide an inductive circuit; a capacitive circuit connected with said inductive circuit to provide a resonant circuit; a bonnet structure substantially enclosing said shaft and said cylinder structure and for supporting said electrical system with the axis of said shaft vertical and having at least said capacitive circuit mounted thereon for support.

2. An electrical system for providing electrical energy, comprising: a drive engine for providing rotary energy including a shaft, revolved during operation of said electrical system; a hollow cylinder structure axially affixed to said shaft to be revolved thereby, said cylinder structure having one flat end thereof substantially closed, and having air-moving fins affixed thereon; a plurality of permanent magnets mounted inside said cylinder structure about the curved surface thereof; a plurality of coils positioned inside said cylinder structure and fixed relative said engine whereby said magnets provide magnetic flux to said coils, said coils including first windings and second windings, said first windings being interconnected to provide an electrical output from said system and said second windings being interconnected to provide an inductive circuit; and a bonnet structure substantially enclosing said shaft, and said cylinder structure and for supporting said electrical system with the axis of said shaft vertical.

3. An electrical system for providing electrical energy, comprising: a drive engine serving as a source of rotary energy, including a shaft, revolved during operation of said electrical system; a hollow cylinder structure axially affixed to said shaft to be revolved thereby, said cylinder structure having one flat end thereof substantially closed, and having air-moving fins affixed thereon; a plurality of permanent magnets mounted inside said cylinder structure about the curved surface thereof; a plurality of coils positioned inside said cylinder structure and fixed relative said engine whereby said magnets provide magnetic flux to said coils, said coils including first windings and second windings, said first windings being interconnected to provide an electrical output from said system and said second windings being interconnected to provide an inductive circuit; a capacitive circuit connected with said inductive circuit to provide a resonant circuit; a bonnet structure substantially enclosing said shaft and said cylinder structure and for supporting said electrical system with the axis of said shaft vertical and having at least said capacitive circuit mounted thereon for support.

References Cited by the Examiner

UNITED STATES PATENTS

| | | | |
|---|---|---|---|
| 2,475,842 | 7/1949 | Jones | 310—153 X |
| 2,568,479 | 9/1951 | Armstrong et al. | 310—153 |
| 2,976,439 | 3/1961 | Kiekhaefer | 310—153 |
| 3,121,838 | 2/1964 | Mozic | 322—96 X |

MILTON O. HIRSHFIELD, *Primary Examiner.*

L. L. SMITH, *Assistant Examiner.*